United States Patent [19]

Takeumura et al.

[11] 3,726,991

[45] Apr. 10, 1973

[54] COLOR TELEVISION IMAGE PICKUP SYSTEM

[75] Inventors: Yasuo Takeumura, Kawasaki; Kazuo Hamaguchi, Yokohama, both of Japan

[73] Assignee: Tokyo Shibaura Electric Co., Ltd., Kawasaki-shi, Japan

[22] Filed: Oct. 29, 1971

[21] Appl. No.: 193,889

Related U.S. Application Data

[63] Continuation of Ser. No. 680,202, Nov. 2, 1967, Pat. No. 3,636,247.

[52] U.S. Cl. ............................178/5.4 R, 178/5.4 ST

[51] Int. Cl. ..............................................H04n 9/08

[58] Field of Search ...................178/5.4, 5.2, 5.4 ST, 178/5.4 TC, 5.4 W

[56] References Cited

UNITED STATES PATENTS

| | | | |
|---|---|---|---|
| 2,738,379 | 3/1956 | James et al | 178/5.4 ST |
| 3,300,580 | 1/1967 | Takagi et al. | 178/5.4 ST |
| 2,733,291 | 1/1956 | Kell | 178/5.4 ST |
| 2,892,883 | 6/1959 | Jesty et al. | 178/5.4 ST |
| 3,015,688 | 1/1962 | Ridgeway | 178/5.4 ST |

*Primary Examiner*—Richard Murray
*Attorney*—Stephen H. Frishauf

[57] ABSTRACT

A light from the picked up object is divided into two portions by a first optical system. A luminance signal is produced from one of the divided portions and a chromaticity signal is obtained from the other divided portion by a second optical system. This second optical system is intended to picks up first and second color lights and is arranged such that the first color light is left intact and the second color light is intercepted in the form of stripes. The chromaticity and luminance signal are than combined to produce a three color signal.

8 Claims, 23 Drawing Figures

COLOR TELEVISION IMAGE PICKUP SYSTEM

This is a Continuation of U.S. application Ser. No. 680,202, filed Nov. 2, 1967, now U.S. Pat. No. 3,636,247.

The present invention relates to a colour television image pickup system and more particularly to an improved image pickup system using the image pickup tubes for the separate luminance colour television.

As is well known, colour television image pickup systems which picks up signals of three colours: red (R), green (G) and blue (B) from a single pickup tube include those types which, at the stage of optical images, arrange these images into a form adapted for time division multiplex or frequency division multiplex. All these types process optical images using a striped filter or the like before they enter the image pickup tube. With the known methods, therefore, complicated and high precision optical equipment was required to obtain satisfactory resolution and signal to noise ratios indispensable to television signals. Hence the prior art image pickup devices presented a large number of problems with respect to the manufacture of equipment.

Heretofore, the pickup of signals of three colours, namely, red (R), green (G) and blue (B), from a single pickup tube has been carried out, for example, by the following process. That is, an actual image of the picked up object is first formed by a pickup lens, and the actual image is conducted to a relay lens through two colour striped filters placed near the actual image, and then focused through the relay lens on the photoelectric plane of the image pickup tube. One of the colour striped filters consists of yellow and transparent portions arrnged alternately in the form of stripes, thereby causing a blue light passing therethrough to be intercepted similarly in the form of stripes. The other colour striped filter is composed of bluish green and transparent portions arranged alternately in the form of stripes, thereby causing a red light passing therethrough to be intercepted similarly in the form of stripes. The latter filter is so set as to have a large pitch than the former, and these colour striped filters are arranged in such a manner that striped patterns of light resulting from the passage of blue and red lights through the transparent portions of the filters are focused together on the photoelectric plane of the image pickup tube. Scanning of the images focused on the photoelectric plane produces output signals whose frequency properties consist of a low frequency component (a signal containing R, G and B) and a high frequency component (R and B signals). The low frequency component of the $R + G + B$ signal has a bandwith from 0 to 3 Mc, and that of the R signal from 3 to 5 Mc with the carrier wave of 4 Mc as the mean and that of the $B$ signal from 5 to 6 Mc with the carrier wave of 5.5 Mc as the mean. The output signals are separated for each band by a band pass filter and a low pass filter respectively. After the output signals are demodulated by a demodulator, there are obtained three signals of $R$, $G$ and $B$ as a chromaticity signal from a matirix circuit. However, the output signals have different bands, so that if they are completely separated by band, the respective signals of R, G and B will necessarily be reduced to a band of 0.5 Mc. The reason is that since the signal of $B$ will have a band of 0.5 Mc after passing through the demodulator, the signals of $R$ and $G$ also have to be restricted to this magntiude of band. Consequently such type of image pickup system is handicapped by the drawbacks listed below:

1. There will be required an optical low pass filter which will display different properties according to the kind of colour to be handled. Namely, if the image pickup tube is assumed to have frequency properties of 6 Mc and the frequencies have to be separated as described above, then there will be required such type of optical low pass filter which will be capable of limiting the signal of green (G) to a band of 3 Mc, the signal of red (R) to 1 Mc and the signal of blue (B) to 0.5 Mc. If, in this case, a broader band width is involved there will occur a cross modulation. With the present day technology, however, it will be next to impossible to develop such an optical low pass filter. The band of the signal of green (G) will be more reduced with the result that there will inevitably take place disturbances by cross modulation.

2. Colour reproducibility will be unsatisfactory. When converted to red, green and blue colours through the matrix circuit, all the band widths will be reduced to 0.5 Mc, thus causing the degradation of resolution. To avoid this, there is indeed a method of using the $G + R + B$ signal as a luminance signal. However, since the luminance signal may be expressed as $Y = 0.30\ R + 0.59\ G + 0.11$ B, such a broad difference between the $G + R + B$ signal and $Y$ signal makes it impossible to reproduce the proper colour.

3. It will be required to provide a vidicon having a high degree of resolution. The 1 inch and two-thirds inch vidicons in common use will present difficulties in covering as broad a band as 6 Mc and will be affected by the degradation of the signal to noise ratio. Even the use of a 1.5 inch vidicon is still insufficient to obtain satisfactory resolution.

4. Intense lighting will be necessary. Since even the 1.5 inch vidicon does not offer good resolution and signal to noise ratio, as described above, strong lighting must be employed.

5. The properties of red, green and blue lights can not be selected independently of each other. While the red and blue lights can be determined by the properties of a striped filter, the properties of the green light are obtained by deducting the red and blue lights from the incident light. This means that if the properties of the red and blue lights are determined, those of the green light will naturally be fixed. It is known that use of such green light will reduce colour reproducibility.

6. The presence of two carrier waves (for example, waves of 4 Mc and 5.5 Mc) will cause beat disturbances. Namely, there will occur beat disturbances corresponding to 1.5 Mc, the difference between the carrier waves of 4 Mc and 5.5 Mc. Such disturbances will be included in low frequency components and appear as noises when reproduced in an image.

On the other hand, the image pickup system of the separate luminance type colour television consists in picking up a luminance signal (Y) and a chromaticity signal (C), using separate image pickup tubes. This image pickup system has wide uses due to the characteristics that as is expected from the nature of the telesision signals, if both resolution and signal to noise ratio of the luminance signal are satisfactory the quality of the scene produced will not be substantially deteriorated, even though those two properties of the chromaticity signal are unsatisfactory to some extent.

Such prior art image pickup system of the separate luminance colour television include a 4-tube type and a 2-tube type. The former type uses one tube for the luminance signal and three tubes for the chromaticity signal, namely, signals of red, green and blue respectively. While this 4-tube type is actually used in broadcasting, it has the drawback that due to the complicated construction of equipment, it is not adapted for simplification. On the other hand, the latter 2-tube type consists of one tube for luminance signal and another tube for chromaticity signal, and picks up three signals of red, green and blue by turns from the latter tube. While this type is more compact than the former, it still has complicated optical and electric systems. Although this 2-tube type is practically used in broadcasting, it is also handicapped by the difficulty of being simplified.

It is accordingly an object of the present invention to make improvements in or relative to the aforementioned shortcomings thereby to provide an image pickup system for the separate luminance type colour television which can be formed from optical and electrical systems of simple construction.

Another object of the present invention is to provide an image pickup system for the 2-tube type colour television which is adapted for simplification.

Still another object of the present invention is to offer an image pickup system for the colour television which is capable of easily picking up the luminance signal and the two-colour chromaticity signal arranged into a frequency division multiplex type.

The process of the present invention employs two image pickup tubes, picking up the luminance signal from one of them and the chromaticity signal from the other. In this case, the optical system to pick up the chromaticity signal is arranged in such a manner that while the first colour light is little affected, the second colour light is intercepted in the form of stripes and these stripes are focused on the photoelectric plane of the image pickup tube for the chromaticity signal. The image thus formed is scanned by the electron beams from the other image pickup tube to produce the two-colour chromaticity signal of the frequency division multiplex type.

FIG. 1 is a diagram of a system according to a first embodiment of the process of the present invention;

FIGS. 2A and 2B respectively present an image on the photoelectric plane of an image pickup tube for the luminance signal of FIG. 1 and an image on the photoelectric plane of an image pickup tube for the chromaticity signal of the same figure;

FIGS. 3A and 3B respectively are schematic diagrams of frequency spectra of the output from the image pickup tube for the luminance signal of FIG. 1 and the output from the image pickup tube for the chromaticity signal of the same figure;

FIG. 4 presents an example of the permeability properties of the dichroic mirror of FIG. 1;

FIG. 5 is a plan view of part of the striped filter of FIG. 1, showing its construction;

FIG. 6A and 6B respectively show examples of the properties of the striped filter of FIG. 1;

FIG. 11A shows the properties of the dichroic mirror and FIG. 11B those of the striped filter;

Figure 13A:
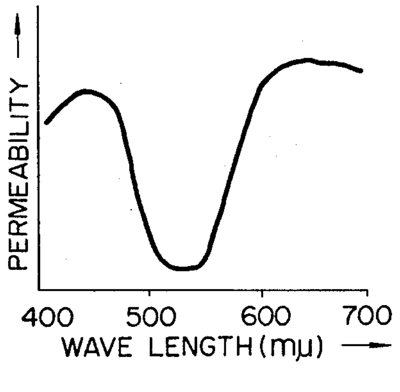
Figure 13B:
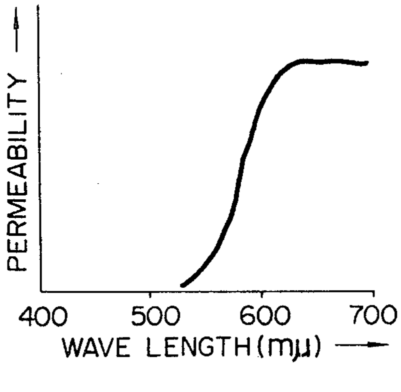
Figure 12:
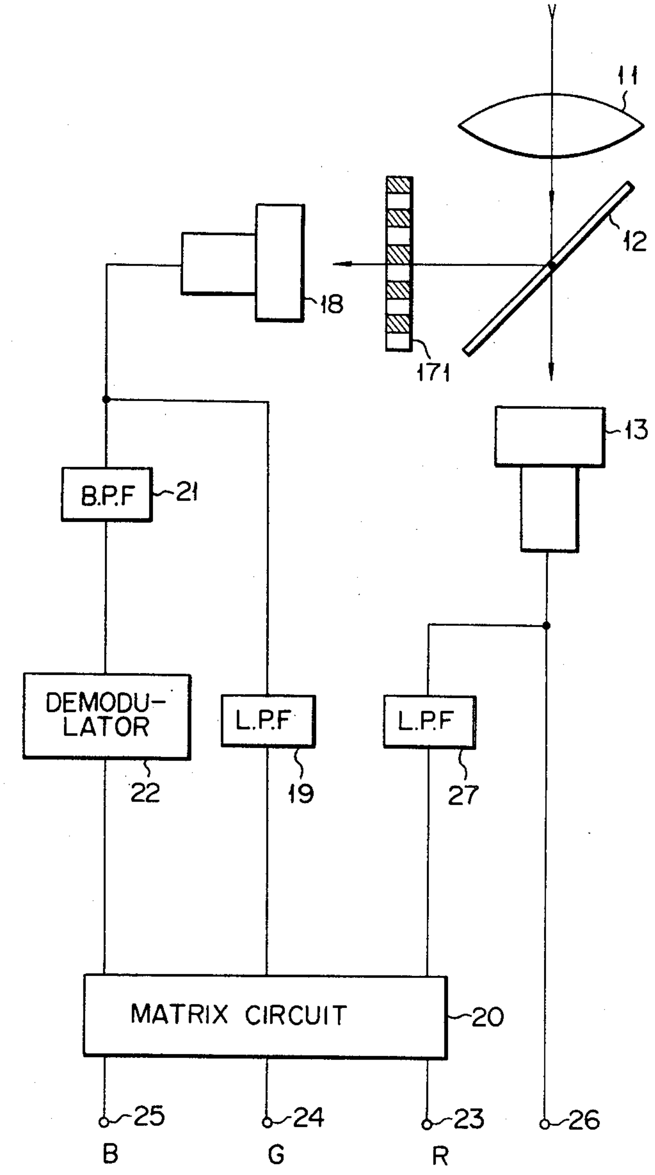
FIG. 12 is a diagram of a system according to a third embodiment of the process of the present invention.
Figure 14:
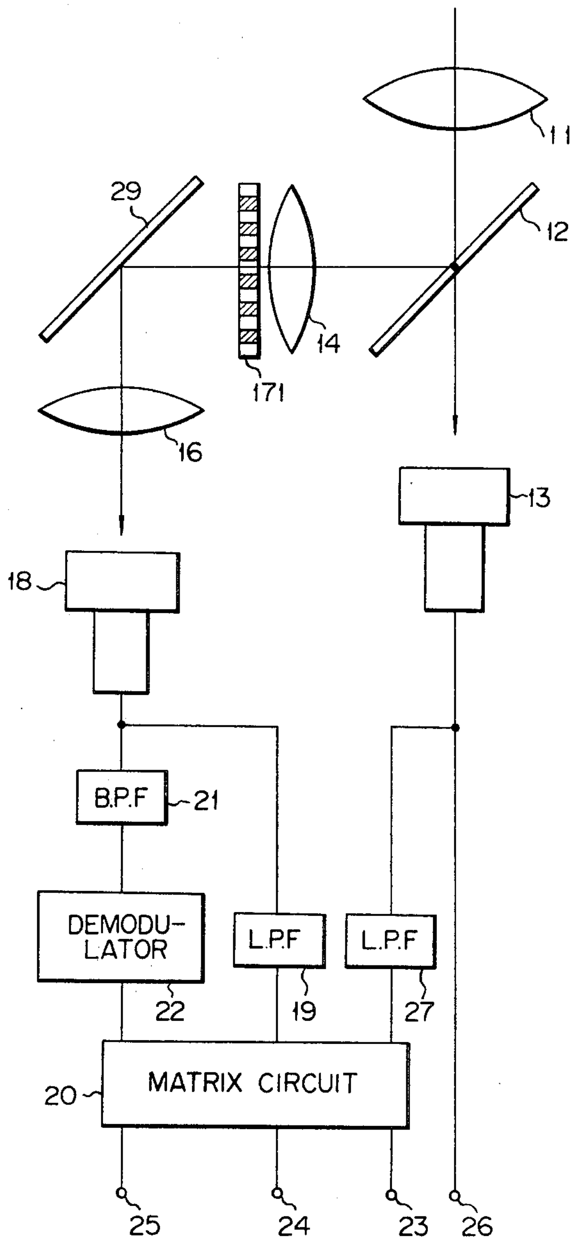
Figure 15:
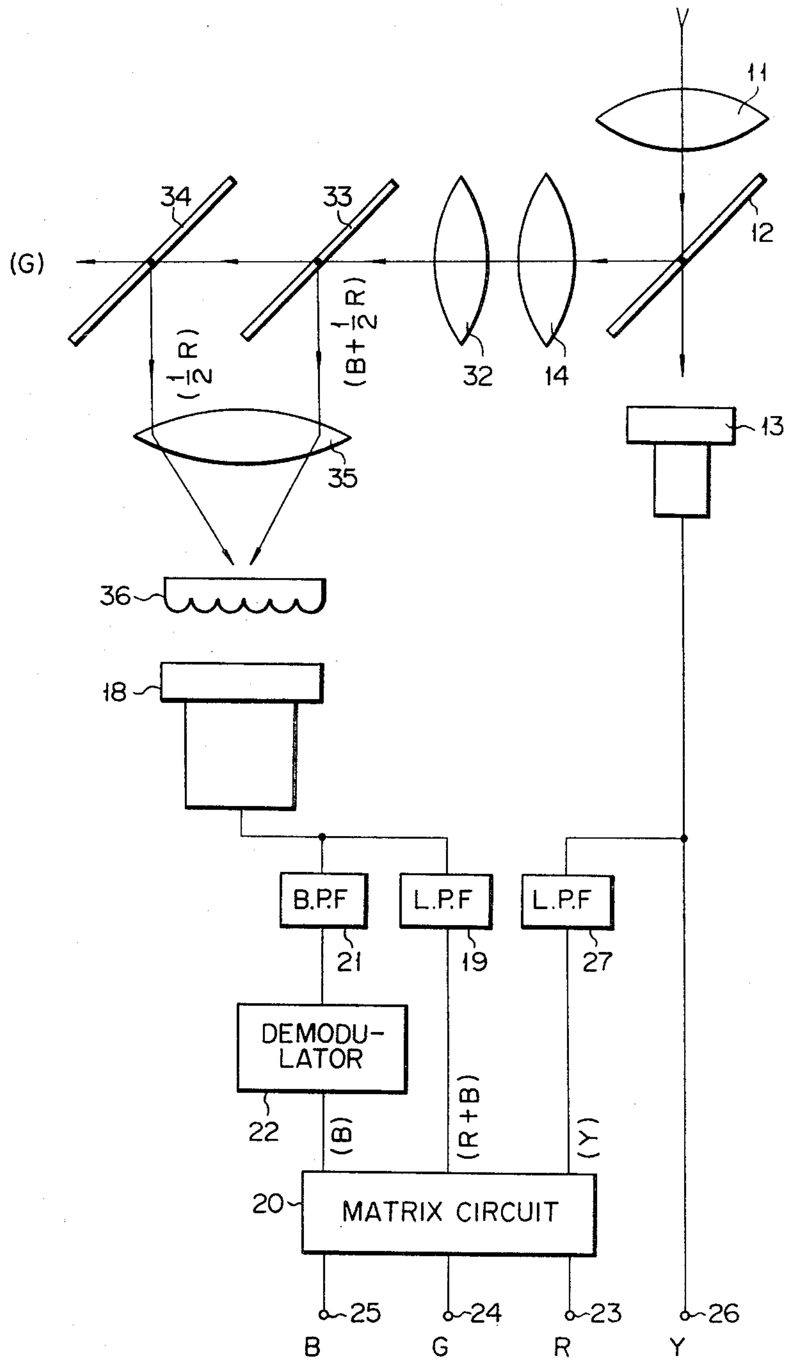
Figure 16A:
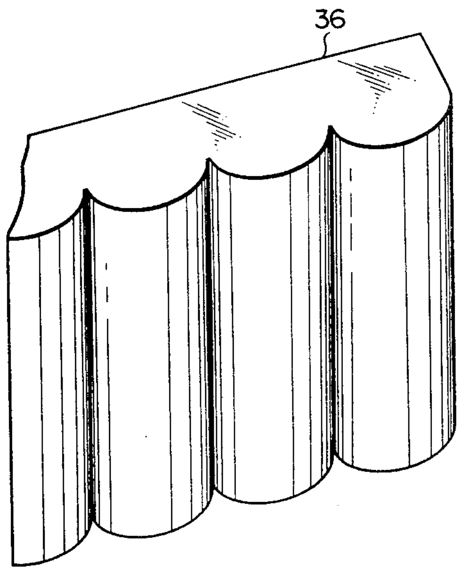
Figure 16C:
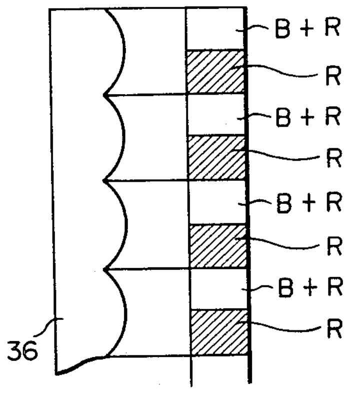
Figure 16B:
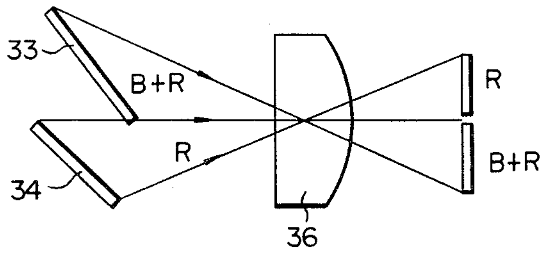

FIGS. 13A and 13B respectively indicate examples of the properties of the striped filter of FIG. 12;

FIG. 14 is a diagram of a system according to a modification of the embodiment of FIG. 12;

FIG. 15 is a diagram of a system according to a fourth embodiment of the process of the present invention; and FIG. 16A is a slantwise view of part of the lenticular lens of FIG. 15, showing its construction, FIG. 16B illustrates the function of the lenticular lens and FIG. 16C shows the stripes produced in an image by the lenticular lens.

Figure 1:
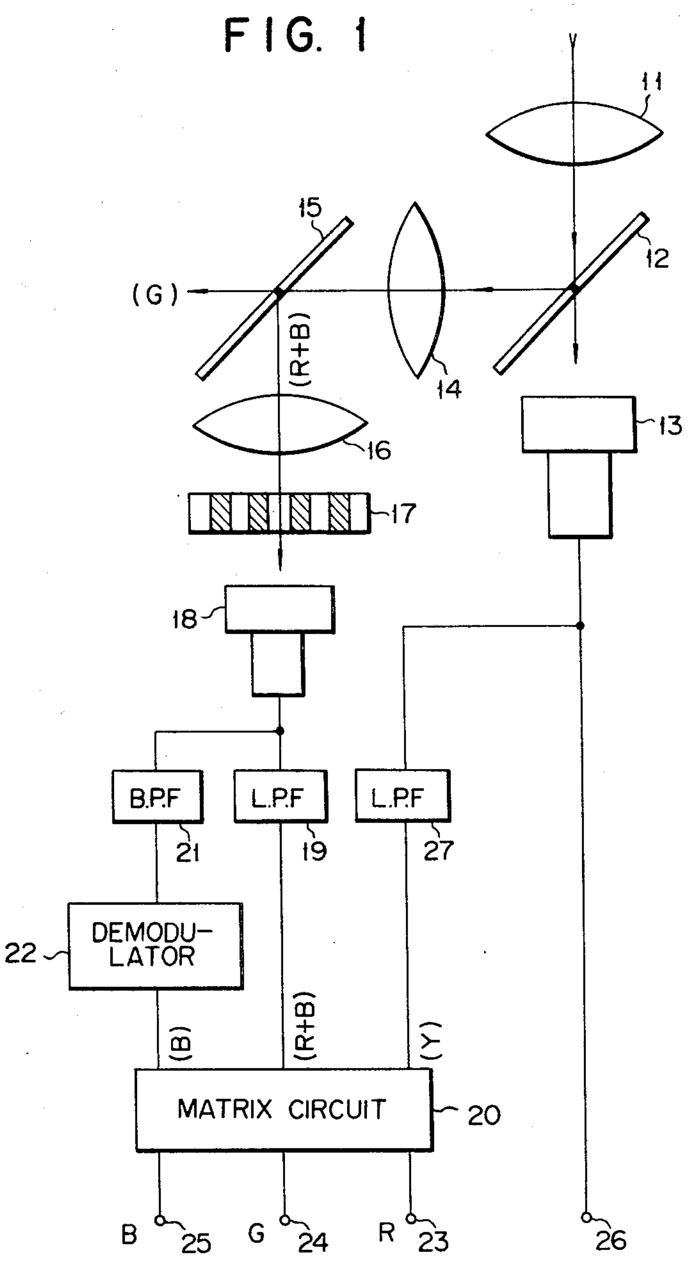
Figure 2A:
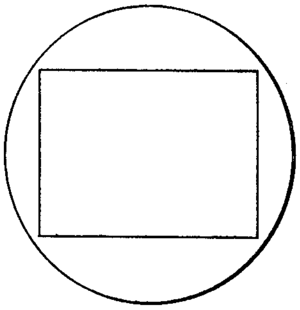
Figure 3A:
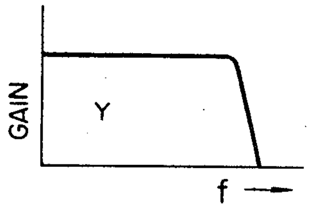

FIG. 1 is a diagram of a system according to a first embodiment of the process of the present invention. Referring to this figure, an incident light from the picked up object is carried through an image pickup lens 11 to a first optical system, for example, to a half mirror 12. The incident light is divided by the half mirror 12 into a light for the luminance signal and a light for the chromaticity signal. The first optical system is arranged in such a manner that the light for the luminance signal is introduced into an image pickup tube 13 for the luminance signal. This image pickup tube 13 consists for example, of a 1 inch vidicon. The light for the chromaticity signal is carried to a second optical system, for example, to a dichroic mirror 15 through a field lens 14. The light for the chromaticity signal is divided by the mirror 15 into first, second and third colour rays, for example, red (R), blue (B) and green (G) lights. The red (R) and blue (B) lights are further carried through a relay lens 16 and a striped filter 17 and focused on the photoelectric plane of the image pickup tube 18 for the chromaticity signal. Such is the arrangement of the second optical system. The image pickup tube 18 consists, for example, of a 1 inch vidicon. Then the output from the image pickup tube 18 for the chromaticity signal is branched off into two parts. One of them is impressed on a low pass filter 19 and further carried therethrough to a matrix circuit 20. The other branched portion of the output from the image pickup tube 18 is supplied to the matrix circuit 20 through a band pass filter 21 and a demodulator 22. The matrix circuit 20 is provided with output terminals 23, 24 and 25 to lead out the three types of the chromaticity signal. On the other hand the output from the image pickup tube for the luminance signal 13 is divided into two portions, one of which is supplied to a terminal 26 and the other to the matrix circuit 20 through another low pass filter 27. produce The functional operation of an image pickup system according to the present invention will hereinafter be described. Incident light from the picked up object (not shown) is transferred through an image pickup lens 11 to a half mirror 12. Part of the incident light is separated by the half mirror 12 and this separated portion of light is conducted to an image pickup tube 13 for the luminance signal as a light for said luminance signal, and focused on the photoelectric plane of the image pickup tube 13 to produce an image as shown in FIG. 2A. Thus scanning by electron beams of the photoelectric plane of the image pickup tube 13 will create the luminance signal (Y) having the frequency spectrum indicated in FIG. 3A.

Figure 2B:
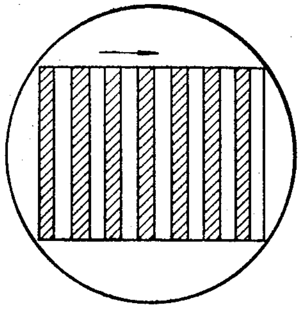
Figure 4:
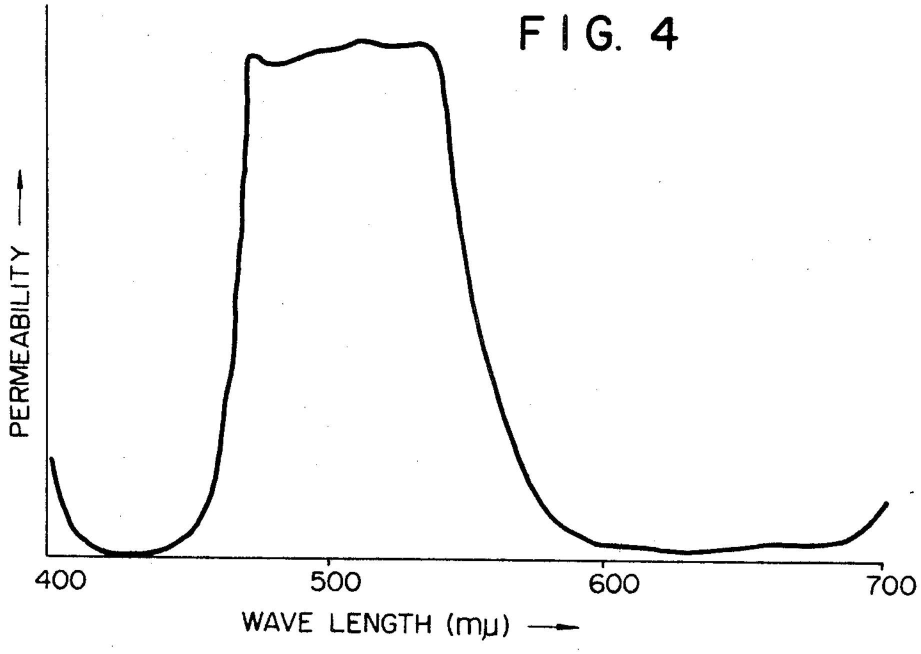
Figure 5:
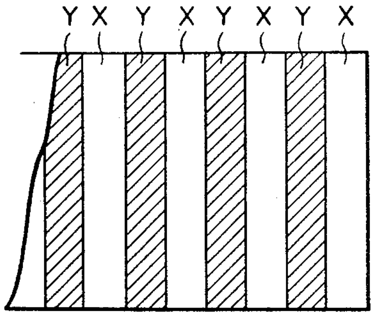
Figure 6A:
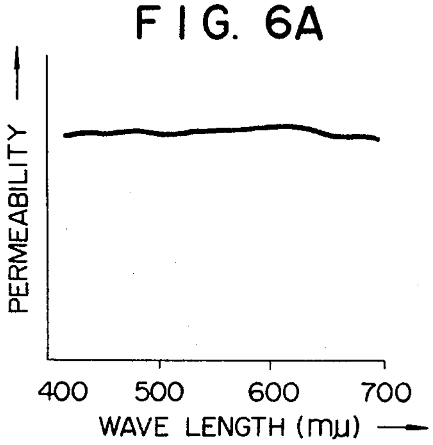
Figure 6B:
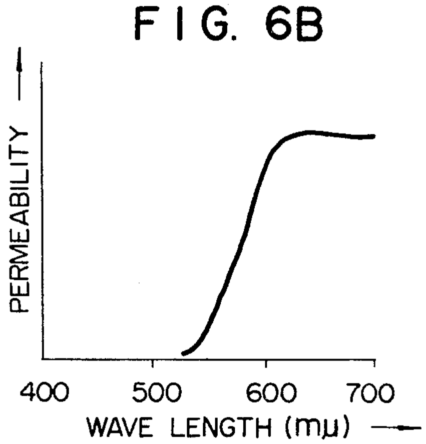

The other portion of the incident light separated by the half mirror 12, namely, a light for the chromaticity signal is carried through the field lens 15 to the dichroic mirror 15. The dichroic mirror 15 comprises thin layers of high refraction material and low refraction material alternately laminated on the glass substratum having two parallel flat planes. For instance, where such a mirror is prepared by depositing films of zinc sulfide (ZnS) and magnesium fluoride ($MgF_2$) by evaporation on said substratum, it will have the spectroscopic properties as shown in FIG. 4. Here the dichroic mirror may be deemed as absorbing no light by itself and reflecting all light components that are incapable of penetrating therethrough. In FIG. 4, the abscissa represents the wavelength and the ordinate represents permeability. As will be seen from FIG. 4 showing the properties of the dichroic mirror, it reflects the portions of a light corresponding to signals of red colour (R) and blue colour (B), namely, a red (R) light and a blue (B) light selectively out of the light for the chromaticity signal, and conducts these two kinds of light to a relay lens 16, but allows the other portion of a light corresponding to a signal of green colour (G), namely, a green (G) light to permeate therethrough. The red (R) and blue (B) lights conducted to the relay lens 16 are further transferred therethrough to a striped filter 17. As will be seen from FIG. 5 presenting a plan view of part of the striped filter, the filter is composed in the form of stripes by arranging alternately the part (X) which permits the permeation of both a red (R) light and a blue (B) light and the part (Y) which does not allow the blue (B) light alone to permeate due to absorption or reflection, but permits only the red (R) light to pass. The permeability properties of these X and Y parts are presented in FIG. 6. FIG. 6A presents an example of the permeability properties of the X part and FIG. 6B that of the Y part. The width and number of stripes will be described later. The red (R) and blue (B) lights which have passed through the striped filter 17 are focused on the photoelectric plane of the image pickup tube 18 for the chromaticity signal. In this case the red (R) light is directly focused almost free from the effect of the stripes, whereas the blue (B) light presents a spotted pattern consisting of light and dark areas in the photoelectric plane of the image pickup tube, because there appear on said plane non-lighted areas to an extent corresponding to the number of stripes contained in the striped filter used. This aspect is illustrated in FIG. 2B. The hatched section of the figure represents the part of the photoelectric plane of the image pickup tube where only a red (R) light appeared and the blank section that part where both red (R) and blue (B) lights were produced. Therefore, when such striped image is scanned in a direction perpendicular to the stripes, namely, in a direction indicated by the arrow of FIG. 2B, then there will be obtained a signal $v(t)$ whose amplitude has been modulated in accordance with the degree of brightness and darkness forming said striped image. The signal $v(t)$ may be expressed by the following formula.

$$v(t)=\frac{F_B(t)}{2}\left\{1+2\sum_{m=1}^{\infty}\frac{\mathrm{Sin}_2^{m}\,\pi}{\frac{m}{2}}\cos m(\omega_b t+\phi)\right\}+F_R(t) \quad (1)$$

Where:

$\omega b$ = angular frequency corresponding to stripes $F_B(t)$ = signals corresponding to B image $F_R(t)$ = signals corresponding to R image The above formula (1) will be further explained hereinafter. Now let us consider the blue light alone. The blue light is denoted as $F_B(t)$ which will be obtained by scanning the image of the picked up object as focused on the photoelectric plane of the image pickup tube, in case it is assumed that a striped filter 17 is not provided. Then, where the striped filter 17 does exist, the blue light will be intercepted in the form of stripes by the Y part of the striped filter to form a striped colour image on the photoelectric plane. Therefore, when the striped colour image on the photoelectric plane is scanned, there will be obtained signals whose amplitude has been modulated by the image of the picked up object. The modulated signal $V_B(t)$ may be expressed as follows:

$$V_B(t)=\frac{F_B(t)}{2}\left\{1+\left[2\sum_{m=1}^{\infty}\frac{\sin_2^{m}}{\frac{m}{2}}\cos m(\omega_b t+\phi)\right]\right\} \quad (2)$$

Figure 7:
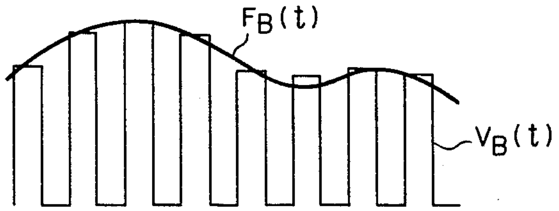
FIG. 7 is an illustration of outputs from the image pickup tube for the chromaticity signal of FIG. 1.

The relationships of $V_B(t)$ and $F_B(t)$ are presented in FIG. 7.

Next let us consider the red light alone. The red light is not affected by the striped filter 17. Therefore where the red colour image on the photoelectric plane is scanned, there will be obtained unmodulated red signals. The red signal thus produced is denoted as $F_R(t)$. Then the output $V(t)$ from the image pickup tube will eventually be obtained in the form of signals consisting of both $V_B(t)$ and $F_B(t)$ overlapped by each other. Hence the output $V(t)$ may, after all, be expressed by the formula (1)

Figure 3B:
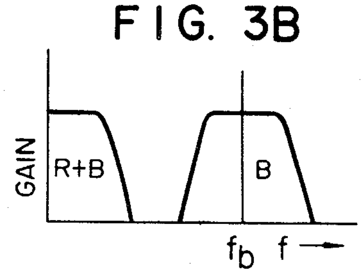

Actually, however, the high frequency component is reduced and the signal to noise ratio is also lowered due to the properties of the optical system and image pickup tube. If, therefore, the high frequency component is eliminated it will be only required to consider the case of $m = 1, 2$ in connection with $m$ of the formula (1). Then this formula may be changed as follows: $V(t) = F_B(t)/2\{1 + 4/\pi \cos(\omega b + \phi)\} + F_R(t)$ The frequency spectrum of the signal $V(t)$ is presented in FIG. 3B.

When the signal $V(t)$ is separated by a low pass filter and a band pass filter, there will be obtained as outputs from the low pass filter $(R + B)$ signals $F_R(t) + F_B(t)/2$ which consist of overlapped red and blue signals. And a modulated blue $(B)$ signals will be obtained as an output from the band pass filter. Deducting, therefore, the modulated blue $(B)$ signal from the $(R + B)$ signal, it will be seen that a red $(R)$ signal is obtained, thus making possible the separation of a red ($R$) signal from a blue ($B$) signal.

Figure 8:
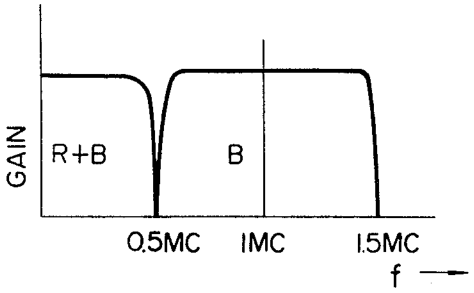
FIG. 8 is a frequency spectrum relating to an example of outputs from the image pickup tube for the chromaticity signal of FIG. 1.

Referring now to the signals of general colour television, the luminance signal ($Y$) is only required to have a band of about 4.5 Mc and the chromaticity signal a band of about 0.5 Mc for both red ($R$) and blue ($B$) signals. Therefore, if the frequency $f_b$ ($=\omega b/2\pi$) of the carrier wave of the blue ($B$) signal whose amplitude has been modulated is allowed to have a band of 1 Mc, then the chromaticity signal as outputs from the image pickup tube 18 will have a total band of about 1.5 Mc as shown in FIG. 8.

There will now be described the width and number of the stripes contained in a striped filter and other related matters, where the band of the carrier wave is set at 1 Mc. When a 1 inch vidicon is used in the image pickup tube 18, the effective area of the photoelectric plane of the vidicon will be about 12.5 × 9.4 mm². And it is required to form a striped colour image all over this area. Where the horizontal scanning frequency is taken as 15.75 Kc and the horizontal blanking period as 16 percent, and the number of colour stripes is expressed as $x$, and the carrier wave obtained by scanning the optical image as $f^{Mc}$, then there will exist between the number of stripes and the carrier wave as the following relationship:

$$f=(15.75\times 10^{-3}/1-0.16)\,x=0.019x$$

Therefore if the carrier wave is taken as $f = l$ Mc, then $x$ will be 53, namely, 53 colour stripes will be required. In this case each colour stripe will have a width of about 0.12 mm. Therefore when the stripes filter 17 is placed in front of the image pickup tube 18 each of the stripes of the striped filter 17 will also be required to have a width of about 0.12 mm. The technique of dyeing different colours alternately with a width of 0.12 mm may be carried out by the commonly used gelatine filter method, etching method or the like. It is advisable for the gelatine filter method to coat dyes on a glass substratum and for the etching method to deposit an interference filter by evaporation on the glass substratum and produce stripes thereon by etching. If, in this case, an absorbing type of filter is used, the X part will be transparent and the Y part will be coloured red. It is also required to prepare these X and Y parts in such a manner that both of them have approximately the same permeability to a red light. If the X and Y parts have different permeabilities, then even the red light will be modulated, producing the unfavourable result of making colour separation difficult.

Referring now to the image pickup tube 18, signals as shown in FIG. 8 have been obtained as outputs therefrom. From these outputs, the ($R + B$) signal is picked up by the low pass filter 19 and conducted to the matrix circuit 20 and the modulated blue ($B$) signal is picked up by the hand pass filter 21, and after being demodulated by the demodulator 22, is also transferred to the matrix circuit 20. On the other hand, the luminance signal ($Y$) obtained from the image pickup tube 13 for the luminance signal has its band restricted by another low pass filter 27 and then is also introduced into the matrix circuit 20. Therefore, the matrix circuit 20 is capable of producing the desired chromaticity signal, namely, the signals of red ($R$), green ($G$) and blue ($B$) colours from the luminance singal ($Y$), ($R$ + $B$) signal and blue ($B$) signal respectively. Between the $R$, $G$, $B$ and $Y$ signals there exists the following relationship:

$$E_Y=0.30\,E_R+0.59\,E_G+0.11\,E_B$$

Therefore the conversion from the $Y$, $R + B$ and $B$ signals to the $R$, $G$ and $B$ signals in the matrix circuit 20 will only require the steps expressed by the following formulas:

$$E_R=(E_R+E_B)-E_B$$

$$E_G=1.70\,E_Y-0.57\,(E_R+E_B)+0.38\,E_B$$

Electrical execution of these conversions may be carried out by the commonly used method of dividing the circuit by resistance values and adding up the quotients obtained.

Restriction of the band of the red ($R$) and blue ($B$) signals to 0.5 Mc may be carried out by optically blurring the focus. Without such optical blurring of the focus, the red ($R$) signal would have a band of more than 0.5 Mc and the modulated blue ($B$) signal will have a band of less than 0.5 Mc, thus making their separation difficult.

The striped filter 17 used in the foregoing embodiment is of such type that it has little effect on the red ($R$) light but partially intercepts the blue light alone. However, it is obvious that the construction of the filter so as to replace these lights with each other will have exactly the same effect. The striped filter 17 used in said embodiment conducts the desired light by permeation to the image pickup tube, but it may, of course, be of such type that will carry the desired light by reflection to the image pickup tube 18.

Figure 9:
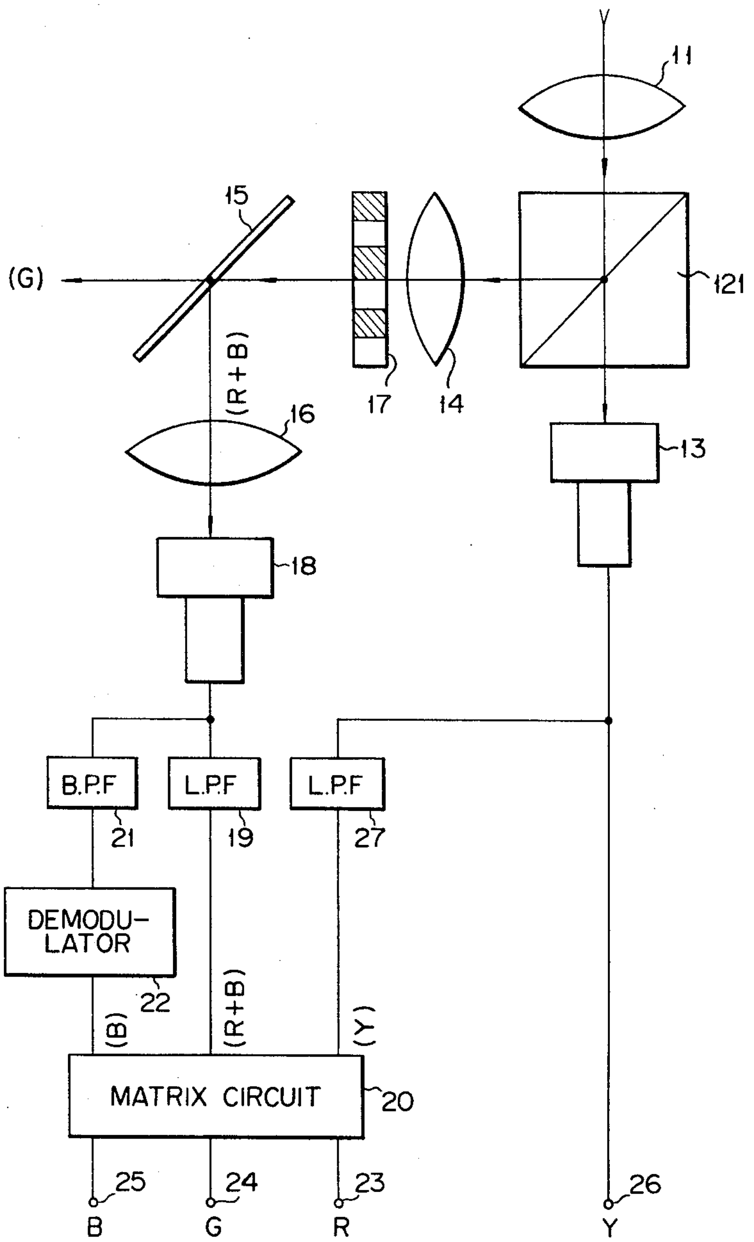
FIG. 9 is a diagram of a system according to a second embodiment of the present invention.

FIG. 9 is a diagram of a system of a second embodiment of the process of the present invention. In this figure, parts the same as or corresponding to those of FIG. 1 are denoted by the same numerals. The second embodiment of FIG. 9 only differs from that of FIG. 1 in that the striped filter 17 is not disposed in front of the image pickup tube, but near the field lens 14, and that the half mirror 12 of FIG. 1 is replaced by a half prism 121 which has the same function as the mirror. However, this half prism 121 may be substituted by the half mirror 12 of FIG. 1.

The functional operation of the second embodiment of FIG. 9 is substantially the same as that of the embodiment of FIG. 1. Since the half prism 121 acts in the same manner as the half mirror 12, the incident light from the picked up object is divided into a light for the luminance signal and a light for the chromaticity signal. The separated light for the chromaticity signal are carried through the field lens 14 to the striped filter 17 positioned near by. If the striped filter 17 is constructed in such a manner that as in the embodiment of FIG. 1, it intercepts a blue light in the form of stripes and has no substantial effect on a red light, then a green light will be eliminated by a dichroic mirror 15. After all, the photoelectric plane of the image pickup tube 18 will have the same image as in the embodiment of FIG. 1. And the step of scanning the image to obtain the chromaticity signal is performed in the same manner as in the embodiment of FIG. 1.

The major difference between the first and second embodiments lies in the position of the striped filter 17.

In this connection, comparison will hereinafter be given of both embodiments. In the first embodiment the striped filter 17 is disposed immediately before the photoelectric plane of the image pickup tube 18. However, the face plate of the image pickup tube 18, namely, a glass plate coated with photoelectric material has a certain thickness so that even if the striped filter is located immediately before the image pickup tube 18 there will be produced a gap between the stripes of the filter and the photoelectric plane of the tube with the resultant blurring of the shapes of stripes projected on said photoelectric plane, and reduced efficiency of detecting the modulated signals. However, where the striped filter 17 is positioned near the field lens 14 as in the second embodiment, there is the advantage that the distinct shapes of stripes will be completely formed on the photoelectric plane, thus enabling the modulated signals to be detected effectively. Moreover, since the field lens 14 and striped filter 17 are only slightly displaced in position, if a relay lens 16 exactly projects the shapes of stripes on the photoelectric plane, the actual image of the picked up object on the field lens 14 will be subject to only slight blurring when it is transferred to the photoelectric plane, thus constituting an optical low pass filter. In general, a scene composed of finer waves than the carrier wave produced by stripes will bring about disturbances due to cross modulation. However, the optical low pass filter favourably prevents frequency components causing such disturbances from being included in a scene.

Figure 10:
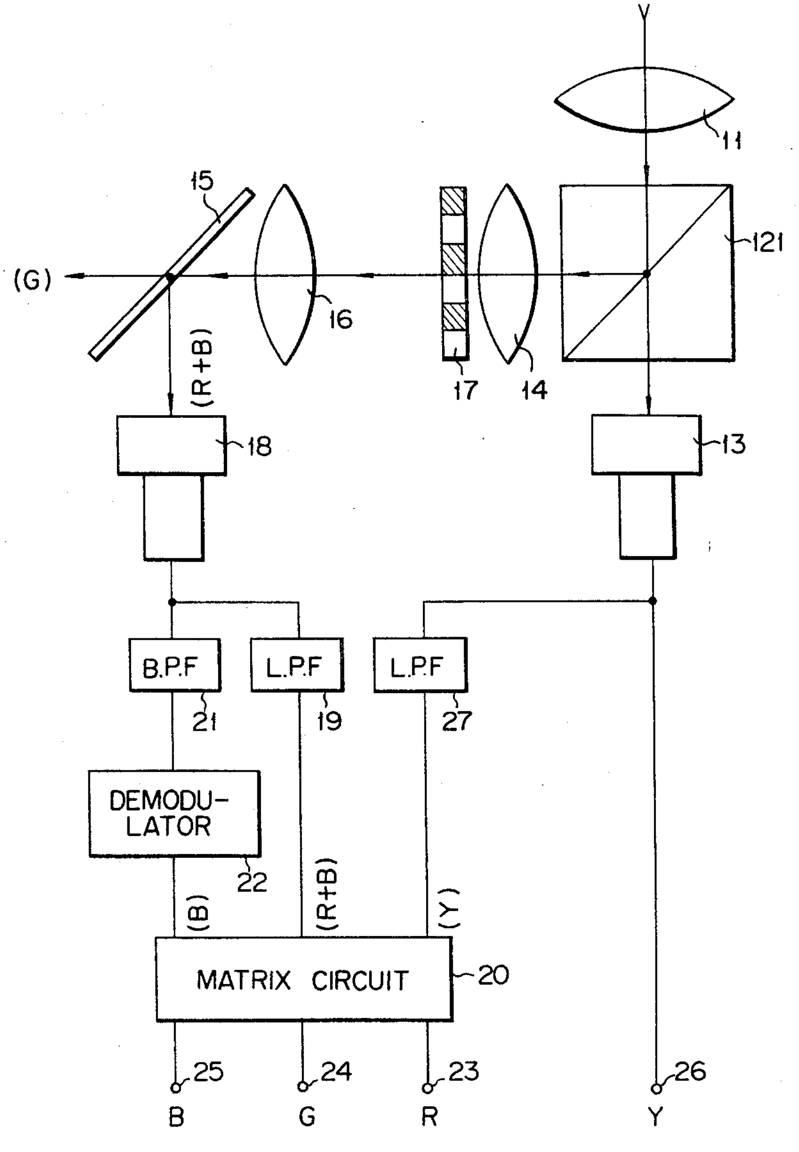
FIG. 10 is a diagram of a system according to a modification of the embodiment of FIG. 9.
Figure 11A:
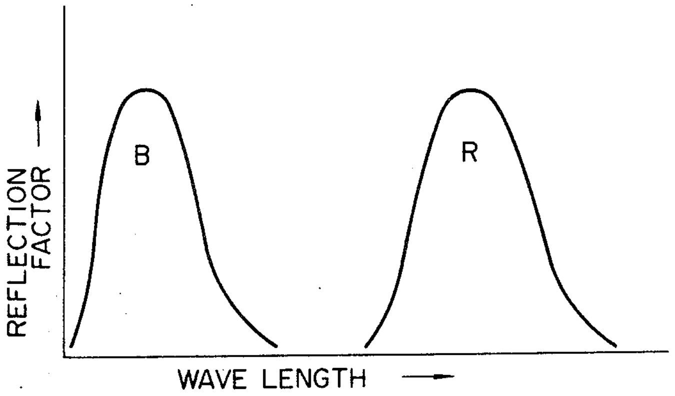
FIGS. 11A and 11B illustrate the properties of the dichroic mirror and those of the striped filter in the first and second embodiments.
Figure 11B:
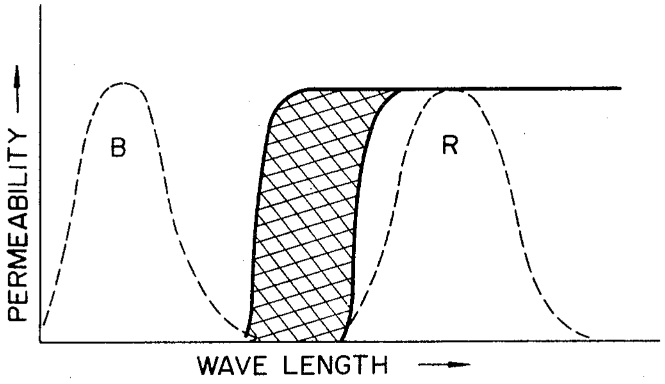

Referring now to FIG. 10 showing a modification of the second embodiment of the present invention, parts the same as or corresponding to those of FIG. 9 are denoted by the same numerals. This embodiment represents a positional exchange of the dichroic mirror 15 and the relay lens 16 of FIG. 9. Their functions are the same as in the embodiment of FIG. 9. Throughout the first and second embodiments, the dichroic mirror 15 is a sort of multifilm interference filter, so that it can display with relative ease such properties as indicated in FIG. 11A. In this figure, the ordinate represents the reflection factor and the abscissa the wave length. If an image pickup tube is designed in advance to display the properties as shown in FIG. 11A, using the dichroic mirror 15 then it is only required to cause the alternate stripes of the striped filter 17 (namely, the hatched portions of the striped filter 17 shown in FIG. 1) to intercept only the blue component of the light. That is, these hatched portions of the striped filter 17 may be of the type which will present the moderate prperties illustrated in FIG. 11B. In FIG. 11A, the abscissa denotes the wave length and the ordinate the reflection factor of the alternate stripes of the striped filter 17. The section of cross hatchings in FIG. 11B means that the permeability to the wave length is only required to fall within the hatched range. And the broken line curves are offered only by way of reference to denote the reflecting properties of the dichroic mirror 15 relative to the wave length. Since the striped filter is allowed to have such moderate properties, it can be fabricated with ease and good permeability. Concretely, the striped filter 17 available for use in the process of the present invention covers the range from the type in which the portions allowing the passage of only a red light are arranged in the form of stripes to the type in which the portions permitting the permeation of a yellow colour in addition to a red one are similarly arranged in a striped pattern. In short, the first and second embodiments permit a combination of a dichroic mirror capable of easily displaying relatively sharp spectroscopic properties and a striped filter presenting moderate properties. Since the dichroic mirror can eliminate the green component of the light lying intermediate between the red and blue components, the striped filter is required to separate only the blue component having a long wave or the red component having a short wave. Because such separation is easy and there is no need for rigid restriction of spectroscopic properties, the manufacture of the striped filter is easy and simple. Also the spectroscopic properties of the striped filter have a certain allowance for fading and discoloration, so that they can be maintained constant over a long period.

The aforementioned first and second embodiments have selectively used red and blue lights as first and second colour lights. While such selection is preferable, there is no need to limit the colour lights to these types. Of course, any kinds of light may be employed, provided they are adapted for decomposition or synthesis.

Referring now to FIG. 12 schematically showing a system according to a third embodiment of the process of the present invention, parts the same as or corresponding to those of FIG. 1 are denoted by the same numerals. The third embodiment omits the dichroic mirror used in the first and second embodiments, but causes the light for the chromaticity signal separated by a half mirror 12 to be carried through a striped filter 171 to the photoelectric plane of an image pickup tube for the chromaticity signal. If, in this case, the striped filter 171 comprises such stripes as consist of the part which allows the permeation of a first colour light, for example, a red light and a second colour light, for example, a blue light, but intercepts a third colour light, for example, a green light and the part which permits only a first colour light, for example, a red light to pass, then the same image in FIG. 2B as those obtained by the first and second embodiments will be formed on the photoelectric plane of the image pickup tube 18. And the step of scanning the image for the chromaticity signal is the same as in the first embodiment. After all, the third embodiment causes a green light to be intercepted by a striped filter 171, whereas the first and second embodiments eliminate the green colour by a dichroic mirror 17. The striped filter of the first and second embodiments may either permit the green light to be permeated or intercepted, but the striped filter 171 of the third embodiment is required to be of a type of intercepting the green light. Namely, the striped filter of the third embodiment comprises an alternate formation of the stripes having the properties shown in FIG. 13A and those which have the properties given in FIG. 13B.

Referring now to FIG. 14 showing a modification of the third embodiment, parts the same as or corresponding to those of FIG. 12 are denoted by the same numerals. This modification comprises a field lens 14 positioned between the half mirror 12 and the striped filter 171, a reflector 29 and a relay lens 16 disposed between the striped filter 171 and the image pickup tube 18 and two image pickup tubes 13 and 18 arranged in parallel. To align the two image pickup tubes 13 and 18 in position, a relay lens 16 may also be placed between the striped filter 171 and the reflector 29. A form shown in FIG. 14, namely, a modification of the third embodiment has a striped filter located near a field lens and eliminates the dichroic mirror used in the first and second embodiments, so that the modification has the following advantages over the first and second embodiments:

1. If a reflector consists of a surface mirror or the full reflection part of a prism is used as a reflector, more than 99 percent of an incident light can be introduced, reducing loss of light to a greater extent than in the case where a dichroic mirror is employed. In the case of a dichroic mirror, red and blue lights are actually allowed to pass, though in a slight degree of several percent, so that loss of light is eventually unavoidable.

2. In general, a dichroic mirror is weak to water, and is gradually reduced in spectroscopic properties when exposed to atmospheric steam, whereas the spectroscopic properties of a reflector are very slow in degradation, so that it is capable of long use with fixed image pickup capacity.

3. A dichroic mirror is a multifilm interference filter and is low in mass productivity due to high coat. In this respect, preference is given to the reflector because of its low cost and the ease of its manufacture.

Referring next to FIG. 15 showing a system according to a fourth embodiment of the process of the present invention, parts the same as or corresponding to those of FIG. 1 are denoted by the same numerals. In FIG. 15, an incident light from the picked up object (not shown) is carried through an image pickup lens 11 to a half mirror 12, and divided by said mirror into a light for the luminance signal and a light for the chromaticity signal, the light for the luminance signal being transferred to an image pickup tube 13 for the luminance signal. On the other hand, the light for the chromaticity signal is introduced into a first dichroic mirror 33 through a field lens 14 and a relay lens 32. The first dichroic mirror extracts the major part of the light for the chromaticity signal, the remainder thereof being carried to a second dichroic mirror 34 which picks up an auxiliary lights are carried to the photoelectric plane of the image pickup tube 18 for the chromaticity signal first through a relay lens 35 and then through a lenticular lens 36. As described above, the fourth embodiment employs two dichroic mirrors and one lenticular lens in place of the dichroic mirror and striped filter used in the first embodiment.

The functional operation of the fourth embodiment will now be described. An incident light from the picked up object (not shown) is transferred through an image pickup lens 11 to a half mirror 12. Part of the incident light is separated by the half mirror 12 and carried to an image pickup tube 13 for the luminance signal as a light for said signal and then focused on the photoelectric plane of the tube 13. Scanning of the photoelectric plane of the tube 13 will produce the luminance signal ($Y$), as in the first to third embodiments. The remainder of the incident light, part of which has been separated by the half mirror 12, namely, a light for the chromaticity signal is carried to a first dichroic mirror 33 through a field lens 31 and a relay lens 32. The first dichroic mirror 33 reflects a first colour light, for example, a light having amounts equivalent to a half of the red ($R$) light and a second colour light, for example, all blue ($B$) light selectively from the lights for the chromaticity signal, and transfers these two light to a relay lens 35 as a main light ($B + R$). The remainder of the light for the chromaticity signal is allowed to permeate through the first mirror 33 to the second dichroic mirror 34. The second dichroic mirror 34 reflects the first colour light, namely, a red ($R$) light selectively from the aforementioned light for the chromaticity signal and carries it to the relay lens 35 as an auxiliary light ($R$), but allows the remainder, namely, a green ($G$) light to permeate therethrough. Referring to the amount of the red light extracted as an auxiliary light, a half of the red ($R$) light has already been picked up by the first dichroic mirror 33, so that the amount of the red ($R$) light selected by the second dichroic mirror 34 represents the remaining half of the first mentioned red ($R$) light. The main light ($B + R$) and the auxiliary light ($R$) conducted to the relay lens 35 are further conveyed to a lenticular lens 36. This lenticular lens resembles a composition in which fine cylindrical lenses functioning in a certain specific direction, but not in a direction perpendicular thereto are integrally joined together in a number corresponding to the picture elements to be handled. Such a lenticular lens is prepared first by forming a mold by cutting and then casting into it plastic material, for example, acrylic resin. The width and number of these linticular components are only required to be 0.24 mm and 53 respectively in order, for example, to carry out horizontal scanning with a frequency of 15.75 Kc and obtain a carrier wave of 1 Mc as in the aforementioned embodiments. FIG. 16A is a slantwise view of a part of a lenticular lens 36 showing its configuration, and FIG. 16B is an illustrative representation of its function. As will be seen from the latter figure, a main light from the first dichroic mirror 33 and an auxiliary light from the second dichroic mirror 34 are focused separately by means of the lenticular lens 36. That is, a light entering one element of the lens (a light corresponding to one picture element) is focused on the photoelectric plane of the image pickup tube 18 as divided into a portion representing a main light ($B + R$) and another representing an auxiliary light ($R$). With respect to a blue ($B$) light, therefore, there will appear, as illustrated in FIG. 16C, portions which do not receive the light, in a number corresponding to that of the elements of the lenticular lens, namely, a striped pattern containing light and dark areas will be formed. On the other hand, a red ($R$) light is always carried to the photoelectric plane of the image pickup tube 18 in amounts equivalent to a half thereof so that it is uniform in the amount and does not present light and dark stripes. Therefore, on the photoelectric plane of the image pickup tube 18, there will be obtained an image as shown in FIG. 2B, and scanning of this image will produce the same chromaticity signal as in the first to third embodiments.

Signals are picked up by the frequency division multiplex system, so that if there are included signal components having a higher degree of frequency than that of a carrier wave there will appear disturbances due to the occurrence of false signals and interference. However, a lenticular lens allows a light corresponding to one picture element to be focused in a uniformly blurred form, and concurrently acts as a low pass filter, thus eliminating the necessity of separately providing any such means.

According to the fourth embodiment as described above, the first dichroic mirror 33 extracts a main light and the second dichroic mirror 34 an auxiliary light. If, conversely, the auxiliary light is picked up by the first dichroic mirror 33 and the main light by the second dichroic mirror 34 there will obviously be obtained the same effect. Also in the fourth embodiment a blue (*B*) light is taken as a first colour light and a red light as a second colour light. However, the blue and red lights may well be exchanged with respect to the order of being picked up. Further, it goes without saying that the first and second colour lights may consist of any other types of colour or a combination thereof, provided that they are adapted for decomposition and/or synthesis.

The fourth embodiment comprises dichroic mirrors and a lenticular lens in its optical system and separates the light by the dichroic mirrors so as to form stripes, so that this embodiment offers a fuller (approximately 100 percent) utilization of an incident light than the type which intercepts the light by a striped filter or the like for the formation of stripes. Consequently the fourth embodiment enables an image to be picked up even at a low degree of lighting and displays improved signal to noise ratios.

The advantages common to the first to fourth embodiments will hereinafter be described:

1. The optical system is simple.

Red and blue signals can be formed into a frequency division multiplex type using a simple optical system, with the resultant higher utilization of light.

2. The electric circuit is simple.

A low pass filter, band pass filter, matrix circuit and demodulator are all that is required theoretically. Since the signal system does not need any special arrangement, the electric system is also simple.

3. The chromaticity signal is obtained easily and assuredly.

Since both red and blue signals are allowed to have the same band width, the separation of their frequencies can be carried out optically with certainty and also electrically with ease.

4. There is the advantage of separate luminance.

The chromaticity signal is allowed to be unsatisfactory to some extent with respect to both resolution and signal to noise ratio, so that the optical and electric systems for this signal is simple.

5. There is the advantage of a two-tube system.

The separate luminance two-tube system makes it relatively easy to carry out the simultaneous registration of the points of scanning images on the photoelectric planes of two image pickup tubes. Neither is complicated the electric circuit including image pickup tubes.

Throughout the aforementioned embodiments, signals of red (R), blue (B) and green (G) colours are produced from the chromaticity signal obtained by the image pickup tube 18 using a low pass filter, band pass filter, demodulator, matrix circuit, etc. However, it is also permissible to transfer the chromaticity signal obtained by the image pickup tube just in the division multiplex form in which it is initially picked up, so as to produce the signals of red (R), blue (B) and green (G) colours on the signal receiving side. It is also possible to produce colour-differential signals of R-Y and B-Y or signals of I and Q in place of signals of red (R), blue (B) and green (G) as outputs from the matrix circuit. Further, both the half mirror 12 and half prism 121 are intended to divide the incident light into a light for the luminance signal and that for the chromaticity signal, and, if required, the ratio of such division may be changed. In general, the light for the chromaticity signal is subject to great optical loss, so that with 30 percent apportioned to the light for the luminance signal, the amount of the light for the chromaticity signal may be increased so as to have a 70 percent ratio of division.

The common vidicon displays a degree of sensitivity approximating the spectroscopic properties of the luminance signal and produces signals approaching the luminance signal as it stands. However, to align the signals thus obtained completely with the spectroscopic properties of the regular luminance signal, a correlation filter may be disposed between the image pickup tube 13 for the luminance signal and the half mirror 12.

As mentioned above, the image pickup system of the present invention for colour television comprises simple optical and electrical systems and offers considerable practical advantages.

While the invention has been described in connection with some preferred embodiments thereof, the invention is not limited thereto and includes any modifications and alterations which fall within the true spirit and scope of the invention as defined in the appended claims.

What is claimed is:

1. An image pickup apparatus for colour television comprising:

- an image pickup lens (11) through which incident light from an object to be picked us is transferred;
- means (121) for dividing said incident light into first and second lights;
- a first image pickup tube (13) having a photoelectric plane directly receiving said first light, said first image pickup tube (13) producing a luminance signal in accordance with said first light;
- a field lens (14) for focusing said second light;
- a striped filter (17) for intercepting at least one colour component of said focused second light;
- a relay lens (16) through which the output of said striped filter (17) is passed;
- a dichroic mirror (15) for reflecting two colour components of the light passed through said relay lens;
- a second image pickup tube (18) having a photoelectric plane receiving the light reflected by said dichroic mirror, said second image pickup tube (18) producing a two-colour chromaticity signal; and
- means combining said luminance signal with said two-colour chromaticity signal to obtain a three colour signal.

2. An image pickup apparatus for colour television according to claim 1 wherein said dividing means comprises a half prism.

3. An image pickup apparatus for colour television according to claim 1 wherein said dividing means comprises a half mirror.

4. An image pickup apparatus for colour television according to claim 1 wherein the optical path between said image pickup lens 13 and said first image pickup tube 13 lies on a straight line.

5. An image pickup apparatus for colour television comprising:

an image pickup lens (11) through which incident light from an onject to be picked up is transferred;

means (121) for dividing said incident light into first and second lights;

a first image pickup tube (13) having a photoelectric plane directly receiving said first light, said first image pickup tube (13) producing a luminance signal in accordance with said first light;

a field lens (14) for focusing said second light;

a striped filter (17) for intercepting at least one colour component of said focused second light;

a dichroic mirror (15) for reflecting two colour components of the light passed through said striped filter (17);

a relay lens (16) through which the light reflected by said dichroic mirror (15) is passed;

a second image pickup tube (18) having a photoelectric plane on the light reflected by said dichroic mirror (15) is focused by said relay lens (16), said second image pickup tube (18) producing a two-colour chromaticity signal; and means for combining said luminance signal with said two-colour chromaticity signal to obtain a three colour signal.

6. An image pickup apparatus for colour television according to claim 5 wherein said dividing means comprises a half prism.

7. An image pickup apparatus for colour television according to claim 5 wherein said dividing means comprises a half mirror.

8. An image pickup apparatus for colour television according to claim 5 wherein the optical path between said image pickup lens (13) and said first image pickup tube (13) lies on a straight line.

* * * * *